United States Patent [19]

Tootle

[11] 4,440,068
[45] Apr. 3, 1984

[54] HYDRAULIC COWL DOOR ACTUATOR WITH ANTI-VIBRATION LOADING DEVICE, AND ASSEMBLY EMPLOYING SAME

[75] Inventor: James N. Tootle, Kalamazoo, Mich.

[73] Assignee: Pneumo Corporation, Boston, Mass.

[21] Appl. No.: 245,446

[22] Filed: Mar. 19, 1981

[51] Int. Cl.³ .............................................. F01B 11/02
[52] U.S. Cl. ....................................... 92/85 A; 92/52; 92/85 B; 92/113
[58] Field of Search .......................... 92/85 A, 52, 113; 123/41.7

[56] References Cited

U.S. PATENT DOCUMENTS

| | | | |
|---|---|---|---|
| 1,519,599 | 12/1924 | Street | 92/85 A |
| 2,266,867 | 12/1941 | Hume | 92/85 A |
| 2,564,530 | 8/1951 | Guery | 123/41.7 |
| 3,803,988 | 4/1974 | Orr | 92/85 A |
| 3,838,759 | 10/1974 | Schmoelz et al. | 92/85 A |
| 3,877,344 | 4/1975 | Langland | 91/406 |
| 3,878,769 | 4/1975 | Farmer | 92/51 |
| 4,043,254 | 8/1977 | Jaeger | 92/85 B |

*Primary Examiner*—Paul E. Maslousky
*Attorney, Agent, or Firm*—Maky, Renner, Otto & Boisselle

[57] ABSTRACT

A single ended hydraulic actuator requiring hydraulic pressure to extend the piston for raising the cowl door of a jet engine and the like. A preload spring device carried in the piston-rod assembly produces an extend force when the actuator is retracted and the door is closed which preloads the actuator to help eliminate fretting of the bearings and piston rod which otherwise can occur due to flight vibrations when unloaded.

8 Claims, 2 Drawing Figures

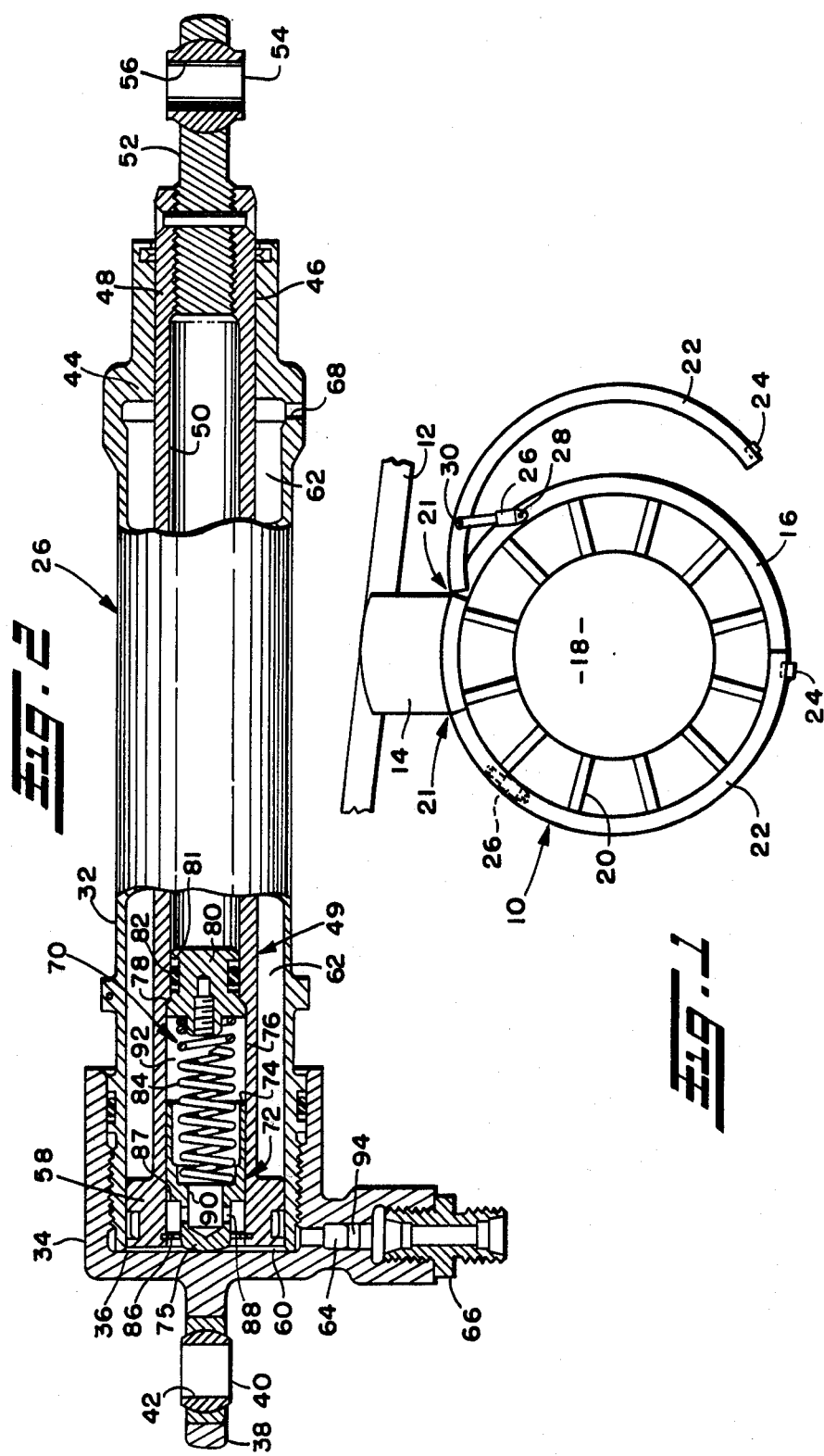

HYDRAULIC COWL DOOR ACTUATOR WITH ANTI-VIBRATION LOADING DEVICE, AND ASSEMBLY EMPLOYING SAME

FIELD OF THE INVENTION

This invention relates generally to a hydraulic actuator with anti-vibration loading device that has particular utility in operating an engine aircraft cowl door assembly.

BACKGROUND OF THE INVENTION

Cowl doors are utilized in aircraft jet engine housings to provide for convenient access to the interior engine components for inspection, service and repair. Typically, two such cowl doors are employed at each side of the engine housing and are hingedly connected at their top ends to the housing so that they can be swung open and closed by raising and lowering the same. To open or raise the cowl doors, which may be quite large and heavy on the larger jet engines, single ended hydraulic actuators are employed. Such actuators are pivotally connected by suitable bearings between the cowl doors and the engine housing so that upon powered extension thereof, the door will be moved from its closed or lowered position to its open or raised position. To close the door, the actuator is depowered so that the door will swing down either from its own weight or with manual assistance. When the door is closed, suitable locks are provided to maintain the door in its closed position while the actuator remains in its depowered or passive state.

It has been found in cowl door assemblies of the aforementioned type that fretting of the actuator piston rods and the connecting bearings can occur due to flight vibrations when the cowl doors are closed and the actuators depowered. Such fretting may necessitate premature replacement of the actuator and/or bearings which in both time consuming and costly, and in any event, undesirable.

SUMMARY OF THE INVENTION

This invention is directed to the elimination or substantial reduction of the aforementioned fretting in the cowl door assemblies. According to this invention, fretting of the piston rod and bearings is substantially reduced or eliminated by providing each cowl door actuator with a preload spring device which produces an extend force in the actuator when depowered and held retracted by the locked cowl door. This preloads the actuator, and hence the piston-rod and bearings, when the cowl door is closed and locked thereby eliminating or substantially reducing undesirable wearing or fretting of the piston-rod and bearings due to flight vibrations. In the preferred form of the invention disclosed herein, such preload spring device comprises a pusher element telescopically carried in the piston-rod assembly of the actuator and a spring element normally biasing the pusher element to an extended position protruding slightly beyond the end of the piston. As the actuator means its retracted position, the pusher engages the end wall of the cylinder, whereby the pusher is restrained against further rearward movement while the piston continues its movement to the fully retracted position, thereby causing the pusher to compress the spring element to produce an extend force on the actuator. Considering that the actuator when depowered is held in its retracted position by the locked cowl door, the extend force acting on the actuator takes up any play in the cowl door and preloads the piston-rod and connecting bearings all to the reduction or elimination of fretting therein.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing

FIG. 1 is a transverse section through a jet aircraft engine with the lefthand and righthand cowl doors thereof shown respectively in their closed ad opened positions, and the respective actuators therefor shown in their retracted and extended positions; and FIG. 2 is a fragmentary longitudinal section through the retracted actuator of FIG. 1.

DETAILED DESCRIPTION

Referring now in detail to the drawing and initially to FIG. 1, an aircraft jet engine is designated generally by reference numeral 10 and can be seen to be connected to the underside of a wing 12 by pylon 14. The engine generally comprises a fan casing or housing 16 which houses the jet engine core 18 and fan elements 20. Attached to the housing 16 is a pair of cowl doors 22 which are hinged or othewise pivoted at their top ends to the engine housing or frame therefor, as at 21. Normally, the cowl doors are closed and latched or locked by suitable means known to the art which are indicated at 24.

To facilitate inspection, service or repair of the engines, the cowl doors may be opened under power by means of single ended fluid actuators 26. Each fluid actuator 26 has its cylinder end pivotally connected to the housing as at 28 and its rod end pivotally connected to the cowl door as at 30. Powered extension of the actuators causes the cowl doors to swing from their closed position seen at the left in FIG. 1 to their open position seen at the right in FIG. 1. The actuators when depowered will automatically retract under the weight of the cowl doors thus permitting the cowl doors to be closed by their own weight or with some manual assistance.

Referring now to FIG. 2, each fluid actuator 26 can be seen to include a cylinder 32 which is closed at one end by a head 34 which threads onto the cylinder. The cylinder head 34 defines an end wall 36 of the cylinder and has an integral mounting projection or ear 38 in which is fitted a spherical bearing 40. The spherical bearing 40 has a transverse bore 42 adapted to receive a pin or the like on the engine housing 16 for effecting the pivot connection 28. The other end of the cylinder is formed with an integral end wall 44 which has an axial bore 46 through which slidably extends the rod 48 of piston-rod assembly 49. The rod has an axial bore 50 in which is threaded the rod end 52. Fixed in the rod end 52 is a spherical bearing 54 which has a transverse bore 56 adapted to receive a pin or the like on the cowl door for effecting the pivot connection 30.

The piston-rod assembly 49 includes a piston 58 which as seen in FIG. 2 is integrally formed with the rod 48. The piston 58 is slidably and sealingly disposed in the cylinder and divides the cylinder into two chambers 60 and 62. The chamber 60 is in fluid communication via inlet passage or port 64 with a fluid inlet fitting 66 which selectively may be connected by suitable tubing or hoses to a source of high pressure fluid and return for the same. The other chamber 62 is vented to the atmosphere by port 68 provided in the cylinder wall near the integral end wall 44 thereof.

In accordance with the invention, the piston-rod assembly 49 carries a preload spring device 70. The device 70 includes a pusher 72 that has an inner cylindrical guide skirt 74 and an outer reduced diameter portion 75. The guide skirt 74 is slidably received in an axial bore 76 in the piston 58 which is coaxial with and intersects the bore 50. The bore 76 has a slightly greater diameter than the bore 50 so that a shoulder 78 is formed at their intersection. Butted against the shoulder 78 is a stop or plug 80 having an annular groove 81 therein containing a seal 82 to preclude passage of fluid from the bore 76 into the bore 50.

A spring 84 positioned between the plug 80 and pusher 72 normally biases the pusher into engagement with a retainer or snap ring 86 fitted in a concentric groove at the open end of the bore 76. The pusher 72 has a shoulder 87 formed at the intersection of the skirt 74 and reduced diameter portion 75 which is of a greater diameter than the central opening in the snap ring to prevent the pusher from being urged out of the piston-rod assembly 49 by the spring 84.

The reduced diameter portion 75 of the pusher normally extends through the central opening in the snap ring 86 and beyond the end of the piston 58 except when the piston is near its retracted position seen in FIG. 2, in which case the portion 75 is telescoped into the bore 76 against the spring biasing force by reason of it engaging the end wal 36 of the cylinder 32 while the piston continues its movement to the fully retracted position. The reduced diameter portion 75 preferably has radial openings 88 and an axial bore 90 to provide fluid communication between the cylinder chamber 60 and the chamber 92 formed between the pusher 72 and plug 80 in the bore 76 so that pressurized fluid in the chamber 60 may pass into the chamber 90 for lubrication purposes as well as to prevent a fluid lock thereby to permit free telescoping movement of the pusher in the piston-rod assembly.

In operation, to swing or raise each cowl door to its respective open position, pressure fluid is supplied to the chamber 60 in the actuator 26 via the fitting 66 and port 64. The pressurized fluid in chamber 60 acts upon the piston 58 to urge the same to the right as seen in FIG. 2 thereby to extend the rod 48 from the cylinder 32. To close the door, the actuator is depowered by exhausting the pressurized fluid in the chamber 60 through the port 64 and fitting 66 to fluid return. The door then may be swung or lowered to its closed position by its own weight and/or with manual assistance. To prevent the door from closing too rapidly, a metering orifice 94 may be provided in the port 64 to control the rate of flow of fluid from the chamber 60 to return, and hence the rate of retraction of the actuator.

As the piston-rod assembly 49 nears the end of its stroke, i.e., nears its retracted position, the pusher 72 will engage the end wall 36 of the cylinder 32. Further movement of the piston to its retracted position causes the pusher 72 to telescope into the piston-rod assembly against the biasing force exerted by the spring 84. Accordingly, the pusher acting on the end wall of the cylinder preloads the spring 84 which produces an extend force in the actuator. Considering that the actuator when depowered is held in its retracted position by the locked cowl door, the extend force will cause any play in the cowl door to be taken up and will preload the actuator and connecting bearings 40 and 54. This preloading eliminates or substantially reduces fretting of the rod and bearings due to flight vibrations.

Although the invention has been shown and described with respect to a preferred embodiment, it is obvious that equivalent alterations and modifications will occur to others skilled in the art upon the reading and understanding of the specification. For instance, the actuator of this invention may find particular utility in other fluid powered assemblies wherein relatively movable members are movable by an actuator connected therebetween from a locked or otherwise restrained position to another position, and wherein the actuator and connecting elements are subjected to vibrations resulting in fretting thereof when the relatively movable members are in their locked or restrained position. The present invention includes all such equivalent alterations and modifications, and is limited only by the scope of the following claims.

The embodiments in which an exclusive right or property is claimed are defined as follows:

1. A single acting actuator for use in an aircraft jet engine cowl door assembly including a cowl door mounted on an engine housing for movement between opened and closed positions, said actuator comprising a cylinder containing a piston-rod assembly, respective bearing means for connecting said cylinder to one of said door and housing and said piston-rod assembly to the other of said door and housing, said piston-rod assembly being extendable under fluid pressure to open said door, spring means carried by said piston-rod assembly, and means for preloading said spring means when the fluid pressure is released from said cylinder and said piston-rod assembly is retracted, said spring means, when preloaded while said piston-rod assembly is in the retracted position as aforesaid and in the absence of fluid pressure in said cylinder, producing an actuator extend force to preload said actuator and bearings, said cylinder having an end wall, and said means for preloading said spring means including pusher means in said piston-rod assembly operative to engage said end wall as said actuator near its retracted position to preload said spring means which produces such actuator extend force, said pusher means comprising a pusher telescoped in an axial bore in said piston-rod assembly and biased towards said end wall by said spring means, said pusher engaging said end wall and being telescoped into said axial bore against said spring means to produce such actuator extend force as said actuator nears its retracted position, said piston-rod assembly including retainer means for retaining said pusher in said bore for limited telescoping movement, said retainer means having a central opening, and said pusher having a reduced diameter axial extension projecting through said opening and an enlarged diameter guide skirt portion slidably engaging the wall of said bore and engageable with said retainer means to prevent said pusher from being urged from said bore by said spring means.

2. The actuator of claim 1 wherein said axial bore has an enlarged diameter portion and a reduced diameter portion forming a shoulder at their intersection, and a plug engaged with said shoulder, said spring means being disposed between said plug and pusher.

3. The actuator of claim 1 further comprising passage means in said pusher permitting free flow of fluid from said axial bore during such telescoping movement of said pusher into said axial bore against said spring means upon engagement of said pusher with said end wall as aforesaid.

4. The actuator of claim 3 wherein said passage means extends radially through said reduced diameter extension intermediate the ends thereof.

5. A fluid actuator comprising a cylinder, a piston-rod assembly axially movable in said cylinder with its rod extending out of one end of said cylinder, respective bearing means for connecting said cylinder and the rod of said actuator respectively to one and the other of a pair of relatively movable members, said piston-rod assembly being extendable by fluid pressure to move said relatively movable members away from each other, spring means carried by said piston-rod assembly, and means for preloading said spring means when the fluid pressure is released from said cylinder and said piston-rod assembly is retracted for producing an actuator extend force in the absence of fluid pressure in said cylinder to preload said actuator and bearings while said piston-rod assembly remains retracted, said cylinder having an end wall, and said means for preloading said spring means including pusher means in said piston-rod assembly operative to engage said end wall as said actuator nears its retracted position to preload said spring means which produces such actuator extend force, said pusher means comprising a pusher telescoped in an axial bore in said piston-rod assembly and biased towards said end wall by said spring means, said pusher engaging said end wall and being telescoped into said axial bore against said spring means to produce such actuator extend force as said actuator nears its retracted position, said piston-rod assembly including retainer means for retaining said pusher in said bore for limited telescoping movement, said retainer means having a central opening, and said pusher having a reduced diameter axial extension projecting through said opening and an enlarged diameter guide skirt portion slidably engaging the wall of said bore and engageable with said retainer means to prevent said pusher from being urged from said bore by said spring means.

6. A fluid powered assembly comprising a pair of relatively movable members, a fluid piston-cylinder actuator connected between said members for moving said members from a first position to a second position upon extension of said actuator by fluid pressure from a retracted position, respective bearing means for connecting the piston of said actuator to one of said members and the cylinder to the other of said members, and preload means for producing an actuator extend force when the fluid pressure is released from said actuator and said actuator is retracted to preload said actuator and bearings while said piston remains retracted and said members are in such first position for eliminating free play in said actuator and said bearings to thereby reduce fretting caused by vibration of said cylinder and bearings in the absence of fluid pressure in said cylinder, said preload means including a spring loaded pusher means in said piston operative to engage an end wall of said cylinder as said piston nears its retracted position to produce such actuator extend force, said pusher means comprising a pusher mounted for axial movement in an axial bore in said piston and spring means for biasing said pusher towards said end wall, said pusher engaging said end wall and being telescoped into said axial bore against said spring means to produce such extend force as said actuator nears its retracted position, and retainer means for retaining said pusher in said bore for limited telescoping movement, said retainer means having a central opening, and said pusher having a reduced diameter axial extension projecting through said opening and an enlarged diameter guide skirt portion slidably engaging the wall of said bore and engageable with said retainer means to prevent said pusher from being urged from said bore by said spring means.

7. The assembly of claim 6 further comprising lock means for locking said members in such first position, said members being movable from said first position to such second position when said lock means is released upon extension of said actuator by fluid pressure from such retracted position, said spring loaded pusher means being engageable with said end wall of said cylinder when the fluid pressure is released from said actuator and said actuator is retracted for producing such actuator extend force to preload said actuator and bearings when said members are locked against movement in such first position.

8. The assembly of claim 7 wherein one of said members comprises a cowl door of an aircraft jet engine cowl door assembly and the other of said members comprises an engine housing, said cowl door being mounted on said engine housing for movement between such first position in which said cowl door is closed to such second position in which said cowl door is open, said lock means being operative selectively to lock said cowl door against movement when in such first position in which said cowl door is closed and to release said cowl door to permit said cowl door to be moved from such first position to such second position in which said cowl door is open upon extension of said actuator by fluid pressure from such retracted position.

* * * * *